United States Patent

Steptoe et al.

[11] Patent Number: 6,119,820
[45] Date of Patent: Sep. 19, 2000

[54] VENTILATED BRAKE DISC

[75] Inventors: Colin Steptoe; Marcus Brian Mayhall Fenton; Tseng Kuan Kao, all of Rugby; William Anthony Thorpe, Burbage, all of United Kingdom

[73] Assignee: Federal-Mogul Technology Limited, Rugby, United Kingdom

[21] Appl. No.: 09/068,181

[22] PCT Filed: Nov. 25, 1996

[86] PCT No.: PCT/GB96/02901

§ 371 Date: May 4, 1998

§ 102(e) Date: May 4, 1998

[87] PCT Pub. No.: WO97/21042

PCT Pub. Date: Jun. 12, 1997

[30] Foreign Application Priority Data

Dec. 5, 1995 [GB] United Kingdom .................. 9524853

[51] Int. Cl.[7] .................................................. F16D 55/02
[52] U.S. Cl. .................................. 188/71.6; 188/218 XL; 188/264 A
[58] Field of Search ........................... 188/71.6, 218 XL, 188/264 A, 264 AA; 192/70.12, 113.1, 113.2

[56] References Cited

U.S. PATENT DOCUMENTS

| 2,368,621 | 2/1945 | Tack ........................ 188/264 |
| 2,369,328 | 2/1945 | Watts ....................... 188/264 |
| 4,164,993 | 8/1979 | Kobelt .................. 188/218 XL |
| 4,469,203 | 9/1984 | Herbulot et al. ...... 188/218 XL |
| 5,427,212 | 6/1995 | Shimazu et al. ...... 188/218 XL |
| 5,544,726 | 8/1996 | Topouzian et al. ...... 188/264 A |

FOREIGN PATENT DOCUMENTS

| 2260155 | 6/1974 | Germany .............. F16D 65/84 |
| 3539640 | 10/1986 | Germany .............. F16D 65/12 |
| 19533136 | 3/1996 | Germany .............. F16D 65/12 |
| 2001716 | 2/1979 | United Kingdom .... F16D 65/12 |

OTHER PUBLICATIONS

Patent Abstracts of Japan, vol. 008, No. 083 (M–290), Apr. 17, 1984 & JP 59 001825 (Jan. 7, 1984).

Primary Examiner—Robert J. Oberleitner
Assistant Examiner—Pamela J. Lipka
Attorney, Agent, or Firm—Synnestvedt & Lechner LLP

[57] ABSTRACT

A disc brake rotor (10; 50) provides two oppositely-facing annular friction surfaces (20, 22). The rotor (10; 50) comprises a first portion (16) which provides one of said annular surfaces (20), and a second portion (18) which provides the other of said annular surfaces (22). The first and second portions (16, 18) ar arranged in spaced parallel relationship and are joined by vanes (32) between which are defined cooling ducts (34). The ducts (34) extend radially of the rotor (10; 50) and are arranged so that, as the rotor (10; 50) is rotated, air passes through the ducts (34) and acts to cool the rotor (10; 50). In order to increase cooling efficiency, the transverse cross-sectional area of each duct (34) decreases progressively between an inlet (36) to the duct (34) and an intermediate region (40) thereof and increases between said intermediate region and an outlet (38) of the duct (34).

5 Claims, 3 Drawing Sheets

VENTILATED BRAKE DISC

A disc brake rotor is arranged to rotate with a member, such as a wheel of a vehicle or a rotating part of a machine. Such a rotor provides two oppositely-facing annular friction surfaces which, in the operation of the brake, are engaged by blocks of friction material to decelerate the rotor and hence the member. Two of the friction material blocks are moved (usually by hydraulic means) towards one another into contact with the two friction surfaces so that frictional forces occur slowing the rotation of said rotor, and hence of said member. These frictional forces generate considerable amounts of heat which has to be absorbed by the rotor and causes its temperature to rise. If the rotor becomes too hot, the braking performance is adversely affected and the rotor wears rapidly. Thus, such rotors need to have a significant thermal capacity in order to avoid rapid temperature rises.

In order to reduce temperature rises in disc brake rotors, it is conventional to form the rotor so that it comprises a first generally disc-shaped portion which provides one of said annular surfaces, and a second generally disc-shaped portion which provides the other of said annular surfaces. Said first and second portions are of constant thickness and are arranged in spaced parallel relationship. These portions are joined by vanes between which are cooling ducts extending radially outwardly of the rotor. The cooling ducts are arranged so that, as the rotor is rotated, air passes through the ducts and acts to cool said portions of the rotor on their opposite sides to said annular surfaces. Air inlets to said ducts are provided at an inner edge of said first and second portions and the rotor functions as a centrifugal fan driving air outwardly to outlets at the outer edges of said portions. Conventionally, said vanes extend in straight lines radially of the rotor and each vane is of constant thickness along its length (see eg GB 969,845). This geometry has the advantages that it is simple to manufacture (such rotors are normally cast out of metal, usually iron) and that the rotor acts in the same way whatever the direction of rotation (with the advantage that one type of rotor can be provided on both sides of a vehicle). However, this geometry has the disadvantages that the ducts are divergent in cross-sectional area in an outward direction due to the increasing distance between adjacent vanes with increasing radius. This divergence causes deceleration of the air in the ducts which reduces cooling efficiency which is dependant on air velocity. Thus, the cooling efficiency is poor in the region where it is most required, ie in the region of the ducts opposite where the rotor is engaged by the blocks of friction material. This cooling inefficiency is further increased by the tendency in such rotors for the air to flow mainly along the leading edges (in the direction of rotation) of the vanes reducing the effective area for heat transfer to the air.

The disadvantages in cooling efficiency of the conventional rotors described above have been addressed to some extent in other designs of rotor. In some of these designs, the vanes have been curved forwardly relative to the direction of rotation so that the vanes do more work on the air increasing its velocity and hence the cooling effect (and disadvantageously increasing also the work required to rotate the rotor). In other designs, the vanes have been curved backwardly relative to the direction of rotation so that the vanes more closely follow the streamlines of the air. This decreases the work required for rotation and brings the trailing edges of the vanes more into use as heat-transferring surfaces. In other designs (see DE 43 23 782 A1 and WO 95/08727), the thickness of said first and second portions of the rotor increases uniformly in the outwards direction so that the cross-sectional area of each duct is more uniform along its length or indeed constant. This gives the air a more constant velocity along the duct thereby smoothing out the cooling effect. This has the disadvantage that the rotor has increased material at its outer edge thereby increasing its moment of inertia. U.S. Pat. No. 4,469,203 discloses ducts with abrupt discontinuities of cross-section and which are divergent, convergent, or partly divergent and partly convergent, or of constant cross-section. None of these designs has ducts with smooth walls which cause the cooling effect to be concentrated in the region of the ducts where the heat is generated.

It is an object of the present invention to provide a disc brake rotor which has cooling ducts with increased cooling efficiency in the regions of the ducts where most heat is generated.

The invention provides a disc brake rotor arranged to rotate with a member and providing two oppositely-facing annular friction surfaces which, in the operation of the brake, are engaged by blocks of friction material to decelerate the rotor and hence the member, the rotor comprising a first portion which provides one of said annular surfaces, and a second portion which provides the other of said annular surfaces, said first and second portions being arranged in spaced parallel relationship and being joined by vanes between which are defined cooling ducts extending radially outwardly of the rotor, the ducts being arranged so that, as the rotor is rotated, air passes through the ducts and acts to cool the rotor, characterised in that the transverse cross-sectional area of each duct decreases progressively between an inlet to the duct and an intermediate region thereof and increases between said intermediate region and an outlet of the duct, the surfaces of the portions which bound the ducts extending as convex curves between inlets of the ducts and outlets thereof.

In a rotor according to the invention, air flowing in each duct is accelerated to its maximum velocity which it reaches at said intermediate region and thereafter is decelerated. Thus, the air has its maximum velocity in said intermediate region giving increased cooling at that point. This is highly advantageous as the intermediate region can be positioned opposite the points of contact of the blocks of friction material, ie in the region where the heat is generated. The duct can be considered to be a venturi with its throat in said intermediate region.

Preferably, the variation of said transverse cross-sectional area of the ducts is achieved by variation in the thickness of said first and second portions of the rotor. This gives the added advantage that the thickness of said portions is greatest in said intermediate region, thereby increasing the thermal capacity in this critical region. However, it is also possible to achieve the required variation in the transverse cross-sectional area of the ducts by varying the thickness of the vanes or by varying the thicknesses of both said portions and the vanes.

One of said portions of a rotor according to the invention may be thicker in at least one region along the ducts than the other of said portions, thereby giving increased thermal capacity. As is conventional, one of said portions of the rotor may be integral with a hub portion of the rotor and the other portion may be supported by said vanes. In this case, the portion which is supported by the vanes may be thicker at all points along the duct than the other portion. This has the advantage that the thicker portion, which does not have the opportunity to lose heat to the hub portion, has a greater thermal capacity.

The invention may be utilised with rotors having conventional straight vanes or having forwardly curved vanes.

However, it is preferred, in order to increase heat transfer to the air, that the vanes are curved backwardly relatively to the direction of rotation of the rotor. Such vanes may have their inner end portions angled to drive air into the ducts and their outer end portions angled to follow streamlines so that they neither substantially drive the air or are driven thereby.

There now follow detailed descriptions, to be read with reference to the accompanying drawings, of two disc brake rotors which are illustrative of the invention.

Figure 1:
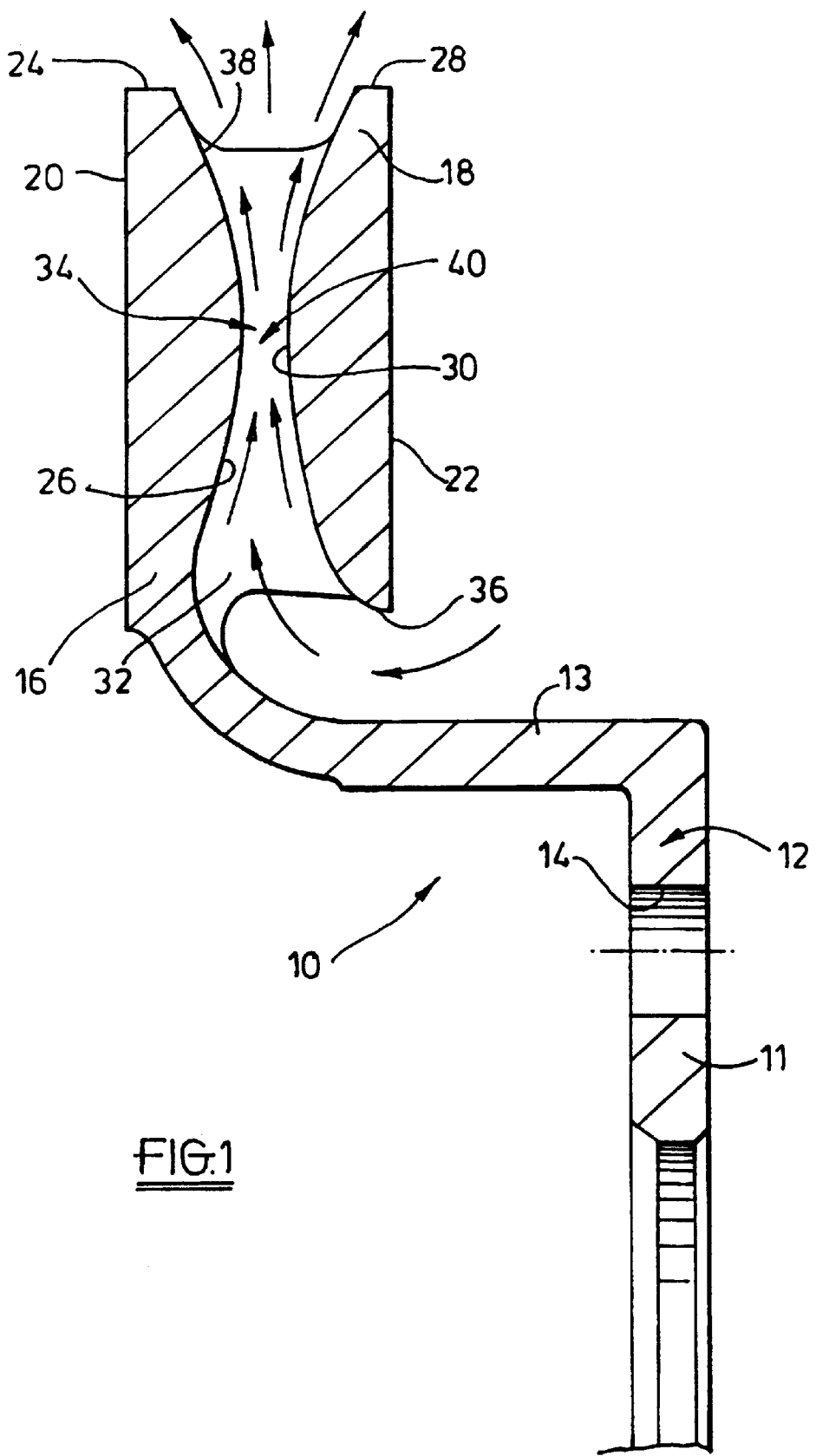
FIG. 1 is one half of a radial cross-section taken through the first illustrative rotor.

The first illustrative disc brake rotor 10 is made of cast iron and is arranged to rotate with a wheel (not shown) of a vehicle. The rotor 10 comprises a hub portion 12 which is provided with bolt holes 14 by which the rotor 12 may be mounted on the wheel's hub (not shown). The hub portion 12 comprises an annular plate portion 11 of constant thickness which fits against said hub. The portion 11 extends in a radial plane around the axis about which the rotor 10 rotates. The holes 14 are formed in the plate 11. The hub portion 12 also comprises a cylindrical portion 13 which extends axially from a junction with the outer edge of the plate 11 and fits around said hub.

The rotor 10 also comprises two portions 16 and 18 which provide two oppositely-facing annular friction surfaces 20 and 22 which, in the operation of the brake, are engaged by blocks of friction material (not shown) to decelerate the rotor and hence the wheel. A first 16 of the portions 16 and 18 is integral with the cylindrical portion 13 of the hub portion 12. At its edge which is remote from the plate portion 11, the cylindrical portion 13 curves outwardly and merges with the portion 16. The portion 16 is shaped generally as an annular plate bounded at it inner edge by its connection with the cylinder portion 13, and at its outer edge by an axially-extending cylindrical surface 24. The portion 16 is also bounded by the friction surface 20, which is planar and extends radially, and by a convex surface 26. Because of the curvature of the surface 26, the portion 16 is at its thickest at a radially intermediate region thereof and is of lesser thickness adjacent to its inner and outer edges.

The portion 18 of the rotor 10 which provides the other annular friction surface 22 is essentially a mirror image of the portion 16 except that the portion 18 does not have a connection with the hub portion 12. The portion 18 is bounded at its outer edge by an axially-extending cylindrical surface 28 which has the same radius as the surface 24. The portion 18 is also bounded by the friction surface 22 which is planar and extends radially, facing in the opposite direction to the surface 20. The portion 18 is also bounded by a convex surface 30 which is similar to the surface 26 which it faces except that, at its radial inner edge, the surface 30 extends further than does the surface 26 and meets the surface 22.

Figure 2:
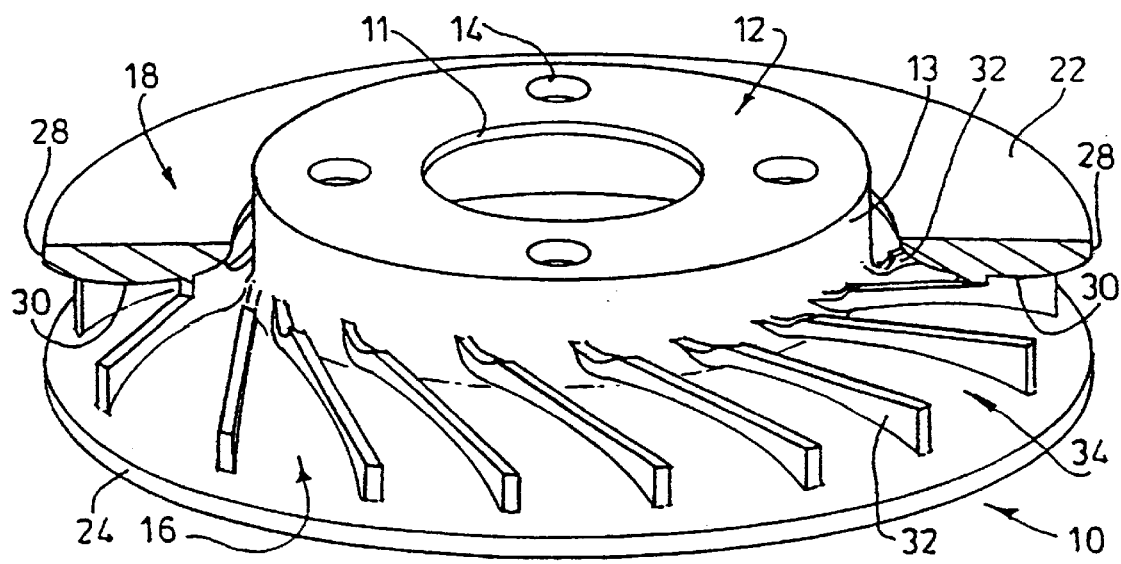
FIG. 2 is a perspective view of the first illustrative rotor showing parts broken away to show the construction.

Said first and second portions 16 and 18 are arranged in spaced parallel relationship and are joined by a plurality of vanes 32 which are cast integrally with the portions 16 and 18. In order to reduce noise by reducing the number of modes of vibration of the rotor 10, the number of vanes 32 is an odd number, preferably a prime number; in this case, there are 23 vanes. In FIG. 2, the vanes 32 which are visible have been sliced through in a plane normal to the axis about which the rotor 10 rotates so that only the junctions between the vanes 32 and the portion 16 are visible. The vanes 32 serve to support the portion 18 (only half the portion 18 is shown in FIG. 2). The vanes 32 project from the surfaces 26 and 30 at equal circumferential intervals.

Each vane 32 is of substantially constant width along its length and, as can be seen from FIG. 2, follows a curved path from the inner edge of the portions 16 and 18 to terminate at a radius which is slightly less than that of the surfaces 24 and 28 (the vanes 32 could, if desired, extend to the surfaces 24 and 28). The vanes 32 are swept backwardly relative to the direction of rotation of the rotor 10 which is indicated by the arrow A in FIG. 2. Except at their inner edge portions, the curvature of the vanes 32 is selected such that they approximately follow the streamlines of air flowing between them as the rotor 10 rotates, thereby improving heat transfer from the trailing edges of the vanes 32 and reducing the resistance to rotation of the rotor. At the inner edge portions of the vanes 32, an angle of approach between the air and the vanes is selected so that this portion of the vanes assists in driving air between the portions 16 and 18, this angle being approximately 45°.

Between each two adjacent vanes 32, a cooling duct 34 is defined which, therefore, extends radially outwardly of the rotor 10 following the curves of the vanes 32. The ducts 34 are so arranged that, as the rotor 10 is rotated, air passes through the ducts 34 and acts to cool the rotor. The ducts have inlets 36 bounded by the inner edges of two adjacent vanes 32, by the junction of the cylindrical portion 13 of hub portion 12 with the portion 16, and by the inner edge of the portion 18. The ducts have outlets 38 between the outer edges of the vanes 32. Between its inlet 36 and its outlet 38, each duct 34 is bounded by two adjacent vanes 32 and by portions of the surfaces 26 and 30.

Figure 3A:
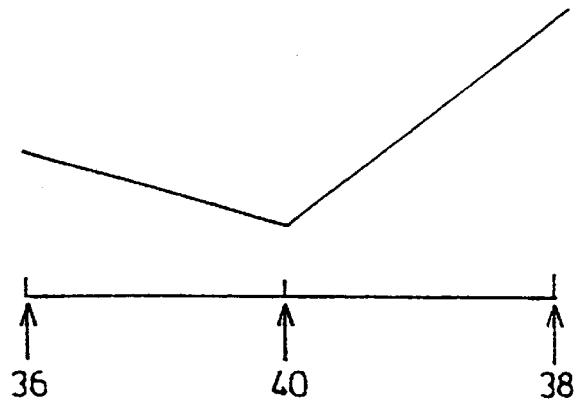
FIG. 3a is a graphical representation of the cross-sectional area of a duct of the first illustrative rotor.
Figure 3B:
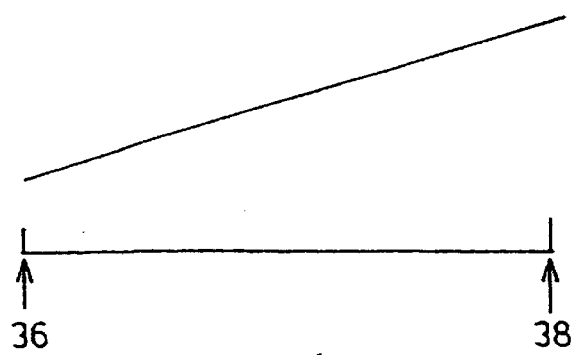
FIG. 3b is a representation similar to FIG. 3a but of a duct of a conventional rotor of the type described above in which the portions providing the friction surfaces are of constant thickness and the vanes are straight.

At any point along its length, the transverse cross-sectional area of a duct 34 depends on the spacing of the adjacent vanes 32 and on the spacing of the surfaces 26 and 30. A controlled variation of this transverse cross-sectional area of the duct 34 is achieved by the variation in the thickness of said first and second portions 16 of the rotor caused by the convexity of the surfaces 26 and 30. Even though the vanes 32 get progressively further apart with increasing radius, the convexity of the surfaces 26 and 30 is such that the transverse cross-sectional area of each duct 34 decreases progressively between its inlet 36 and an intermediate region 40 of the duct 34 where the surfaces 26 and 30 have their closest approach. The intermediate region 40 is substantially opposite the radial centre of the friction surfaces 20 and 22. The transverse cross-sectional area of the duct 34 increases between said intermediate region 40 and the outlet 38 of the duct 34. FIG. 3a gives a graphical representation of the transverse cross-sectional area of one of the ducts 34 at points along the duct. As can be seen from FIG. 3a, the area reduces consistently and linearly from the inlet 36 to the intermediate region 40 and then increases consistently to the outlet 38. A comparison between FIGS. 3a and 3b shows that, in the conventional rotor of FIG. 3b, the transverse cross-sectional area of the duct increases consistently between the inlet and the outlet of the duct, whereas FIG. 3a shows a convergent/divergent duct. As can be seen from FIG. 3a, the area of the duct 34 at the region 40 is about half the area at the inlet 36.

In the first illustrative rotor 10, the portions 16 and 18 have their greatest thickness, and hence greatest thermal capacity, at the intermediate region 40.

In the operation of the first illustrative rotor 10, the rotor is rotated in the direction of the arrow A in FIG. 2. This rotation causes air to enter the inlets 36 through the gap between the inner edge of the portion 18 and the cylindrical portion 13 of the hub portion 12. The air entering the inlets 36 is accelerated along the duct 34 until it reaches the intermediate region 40 of the duct, where the transverse cross-sectional area of the duct reaches its minimum. This acceleration is caused by the decreasing transverse cross-sectional area of the duct 34. At the intermediate region 40, which is arranged to be directly opposite to the points at which the blocks of friction material engage the surfaces 20 and 22, the air reaches its maximum velocity, thereby increasing the cooling efficiency in this region. After passing through the intermediate region 40, the air decelerates until it passes out through the outlet 38 of the duct 34.

Figure 4:
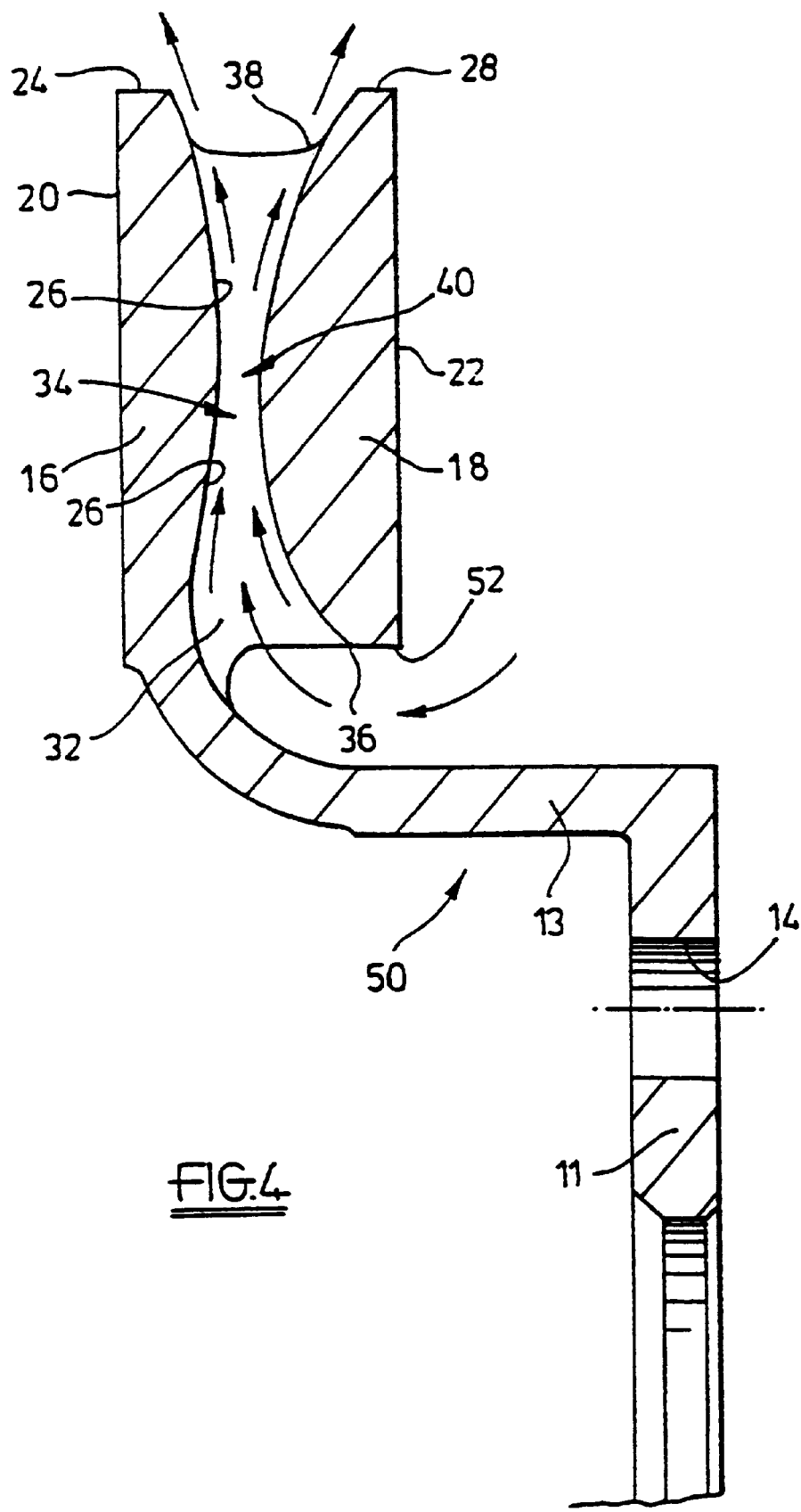
FIG. 4 is a view similar to FIG. 1 but of the second illustrative rotor.

FIG. 4 shows the second illustrative rotor 50. The rotor 50 is identical with the rotor 10 except as hereinafter described and like parts are given the same reference numerals. The rotor 50 differs from the rotor 10 in that the portion 18 thereof is thicker than the portion 16 thereof. In order to accommodate this increased thickness, the surface 28 is lengthened and there is a cylindrical surface 52 joining the surfaces 22 and 30 at the inner edge of the portion 18. Thus, in the rotor 50, the portion 18 which is supported by the vanes 32 is thicker at all points along the ducts 34 than the portion 16. The greater thickness of the portion 18 gives it a greater thermal capacity which is desirable as, unlike the portion 16, the portion 18 cannot lose heat by conduction to the hub portion 12.

Although the first and the second illustrative rotors 10 and 50 are of the type in which the portion 16 which is integral with the hub portion 12 is further from the plate portion 11 than is the other portion 18, it is possible for the nearer of the portions 16 and 18 to be integral with the hub portion 12.

What is claimed is:

1. A disc brake rotor arranged to rotate with a member and providing two oppositely-facing annular friction surfaces which, in the operation of the brake, are engaged by blocks of friction material to decelerate the rotor and hence the member, the rotor comprising a first portion which provides one of said annular surfaces, and a second portion which provides the other of said annular surfaces, said first and second portions arranged in spaced parallel relationship and being joined by vanes between which are defined cooling ducts extending radially outwardly of the rotor, the ducts being arranged so that, as the rotor is rotated, air passes through the ducts and acts to cool the rotor, wherein the transverse cross-sectional area of each duct decreases progressively between an inlet to the duct and an intermediate region thereof and increases between said intermediate region and an outlet of the duct, the surfaces of the portions which bound the ducts extending as convex curves between inlets of the ducts and outlets thereof.

2. A disc brake rotor according to claim 1, wherein the variation of said transverse cross-sectional area of the ducts is achieved by variation in the thickness of said first and second portions of the rotor.

3. A disc brake rotor according to claim 1, wherein one of said portions is thicker in at least one region along the ducts than the other of said portions.

4. A disc brake rotor according to claim 1, wherein the vanes are curved backwardly relatively to the direction of rotation of the rotor.

5. A disc brake rotor according to claim 1, wherein said intermediate region of each duct is substantially opposite the radial center of the friction surfaces.

* * * * *